United States Patent
Chiang et al.

(10) Patent No.: US 7,159,055 B2
(45) Date of Patent: Jan. 2, 2007

(54) PHYSICAL LAYER APPARATUS COMPLIANT TO SERIAL AND PARALLEL ATA INTERFACES

(75) Inventors: Chinyi Chiang, Taipei (TW); Tse-Hsien Wang, Taipei (TW)

(73) Assignee: Via Technologies, Inc., Taipei (TW)

( * ) Notice: Subject to any disclaimer, the term of this patent is extended or adjusted under 35 U.S.C. 154(b) by 56 days.

(21) Appl. No.: 10/429,844

(22) Filed: May 6, 2003

(65) Prior Publication Data

US 2004/0044802 A1 Mar. 4, 2004

(30) Foreign Application Priority Data

Aug. 16, 2002 (TW) .............................. 91118473 A

(51) Int. Cl.
*G06F 13/12* (2006.01)
(52) U.S. Cl. .............................. 710/74; 710/71; 710/72
(58) Field of Classification Search .................. 710/74, 710/71, 72, 62, 2
See application file for complete search history.

(56) References Cited

U.S. PATENT DOCUMENTS 5,905,888 A * 5/1999 Jones et al. ..................... 713/2
6,460,099 B1 * 10/2002 Stryker et al. ................. 710/74
6,532,558 B1 * 3/2003 Allen et al. ................... 714/724
6,535,841 B1 * 3/2003 Meyer .......................... 703/13
6,553,432 B1 * 4/2003 Critz et al. .................... 710/10
6,807,600 B1 * 10/2004 Bissessur et al. ............ 710/313
6,845,420 B1 * 1/2005 Resnick ....................... 710/303
2003/0005231 A1 * 1/2003 Ooi et al. .................... 711/131

* cited by examiner

*Primary Examiner*—Fritz Fleming
*Assistant Examiner*—Harold Kim
(74) *Attorney, Agent, or Firm*—Rosenberg, Klein & Lee

(57) ABSTRACT

A physical layer apparatus compliant for both serial and parallel ATA interfaces is devised. The physical layer apparatus includes a serial ATA physical layer circuit, a channel selection unit and a channel selection controller. The channel selection unit is connected to a media access controller of a host through a first IDE bus. The channel selection unit is further selectively connected to a serial ATA device through the serial ATA physical circuit or connected to a parallel ATA device through second IDE bus. Therefore, the media access controller of the host can selectively access the serial ATA device and the parallel ATA device through the channel selection unit under the control of the channel selection controller.

10 Claims, 5 Drawing Sheets

PHYSICAL LAYER APPARATUS COMPLIANT TO SERIAL AND PARALLEL ATA INTERFACES

FIELD OF THE INVENTION

The present invention relates to a physical layer apparatus for ATA interface, especially to a physical layer apparatus compliant for both serial and parallel ATA interfaces.

BACKGROUND OF THE INVENTION

The storage device interfaces are demanded with more versatility, larger capability and higher transfer rate. For example, an IDE interface (officially called the ATA interface) is developed to support CD-RW, Zip other then hard disk drive. The earliest ATA interface has transfer rate of 16 MBps and is then improved to ATA 33 standard with 33 MBps, ATA 66 with 66 MBps and to ATA 100 and ATA 133 standard. However, the conventional ATA cable is a 40-conducior ribbon cable carrying signals between a motherboard and a hard disk driver. To maximize signal integrity and eliminate potential timing and noise problem, the cable should not be longer than 0.46 meter (18 inches). The cable with large amount of parallel conductors also cause serious electromagnetic interference (EMI) problem.

To overcome above drawbacks, a solution is a new ATA interface called serial ATA (SATA) interface, which uses four signal lines for data transmission and supports existing ATA and ATAPI devices. The serial ATA standard specification includes serial ATA types SATA I with 1.5 GHz bus speed, SATA II with 3 GHz bus speed and SATA III with 6 GHz bus speed, thus greatly enhancing transfer rate even with serial data transmission.

However, the transition from parallel ATA interface to serial ATA interface is gradual one, and during the transition the parallel ATA capability will continue to be available. Therefore, the present computer system can support both parallel ATA interface to serial ATA interface.

FIG. 1 shows a prior art physical layer apparatus for these two ATA interfaces (serial ATA and parallel ATA). The physical layer apparatus comprises a serial ATA physical layer 123 in a media access controller 121 of an I/O controller chip 12 (such as a south bridge chip). The media access controller 121 is connected to a serial ATA device 16 (such as serial ATA hard disk drive) through the serial ATA physical layer 123, and connected to a parallel ATA device 18 (such as a parallel ATA hard disk drive) through an IDE bus 14. The above-mentioned architecture can support both serial and parallel ATA devices. However, the serial ATA physical layer 123 is generally implemented with high-frequency analog circuit having larger occupied area. As a result, the I/O controller chip 12 will have excessively large area and the yield thereof is influenced.

Alternatively, the serial ATA physical layer apparatus may be separated with the media access controller, i.e., provided externally to the media access controller. FIG. 2 shows another feasible architecture of the physical layer apparatus for ATA interface. The I/O controller chip 22 has a media access controller 221 accessing a parallel ATA device 28 through an IDE bus 24. The media access controller 221 accesses a serial ATA device 26 through a serial ATA physical layer 261. More particularly, the serial ATA physical layer 261 is often directly connected to the IDE bus 24 for saving pin count of the I/O controller chip 22. This limits the accessing choice of the I/O controller chip 22 to one of the parallel ATA device and the serial ATA device. It is also inconvenient for user to choose peripheral device at his disposal.

SUMMARY OF THE INVENTION

It is an object of the present invention to provide a physical layer apparatus for both serial ATA and parallel ATA interfaces, wherein a channel selection controller and a channel selection unit is provided in a separated serial ATA physical layer circuit. The channel selection unit has an accessing channel selectively connected to a serial ATA device through the separated serial ATA physical layer circuit or connected to a parallel ATA device through an IDE bus. The channel selection unit is controlled by the channel selection controller for the connection choice of its accessing channel.

It is another object of the present invention to provide a physical layer apparatus for both serial ATA and parallel ATA interfaces, which has a detection circuit detecting a connection state of a serial ATA device to a serial ATA physical circuit and a channel selection controller determines an accessing channel for the channel selection unit.

It is still another object of the present invention to provide a physical layer apparatus for both serial ATA and parallel ATA interfaces, wherein the channel selection controller has a voltage level adapter for adapting a voltage level of a signal to be sent to a media access control through an IDE bus according to a determined accessing channel.

It is still another object of the present invention to provide a physical layer apparatus for both serial ATA and parallel ATA interfaces, wherein the channel selection controller can be software controlled or manually controlled.

The various objects and advantages of the present invention will be more readily understood from the following detailed description when read in conjunction with the appended drawing, in which:

DETAILED DESCRIPTION OF THE INVENTION

Figure 1:
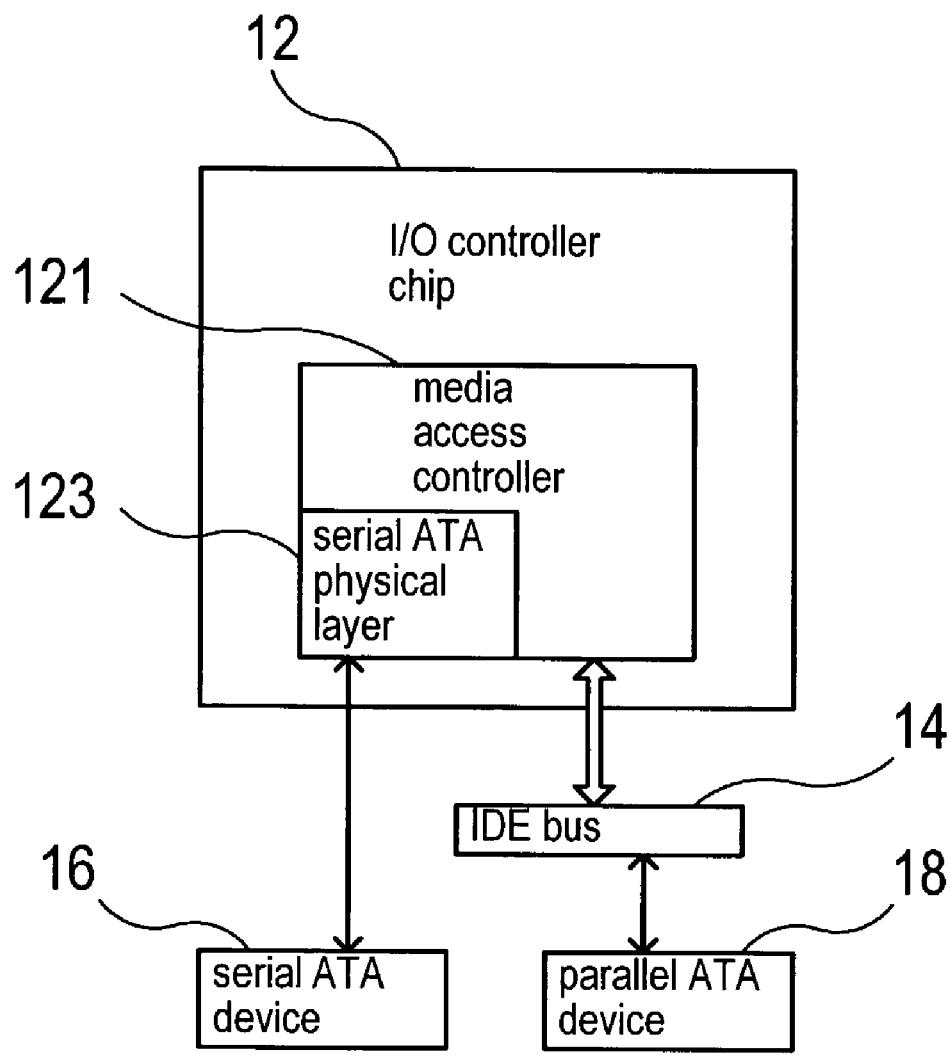
FIG. 1 is a block diagram of a prior art ATA physical layer apparatus.
Figure 2:
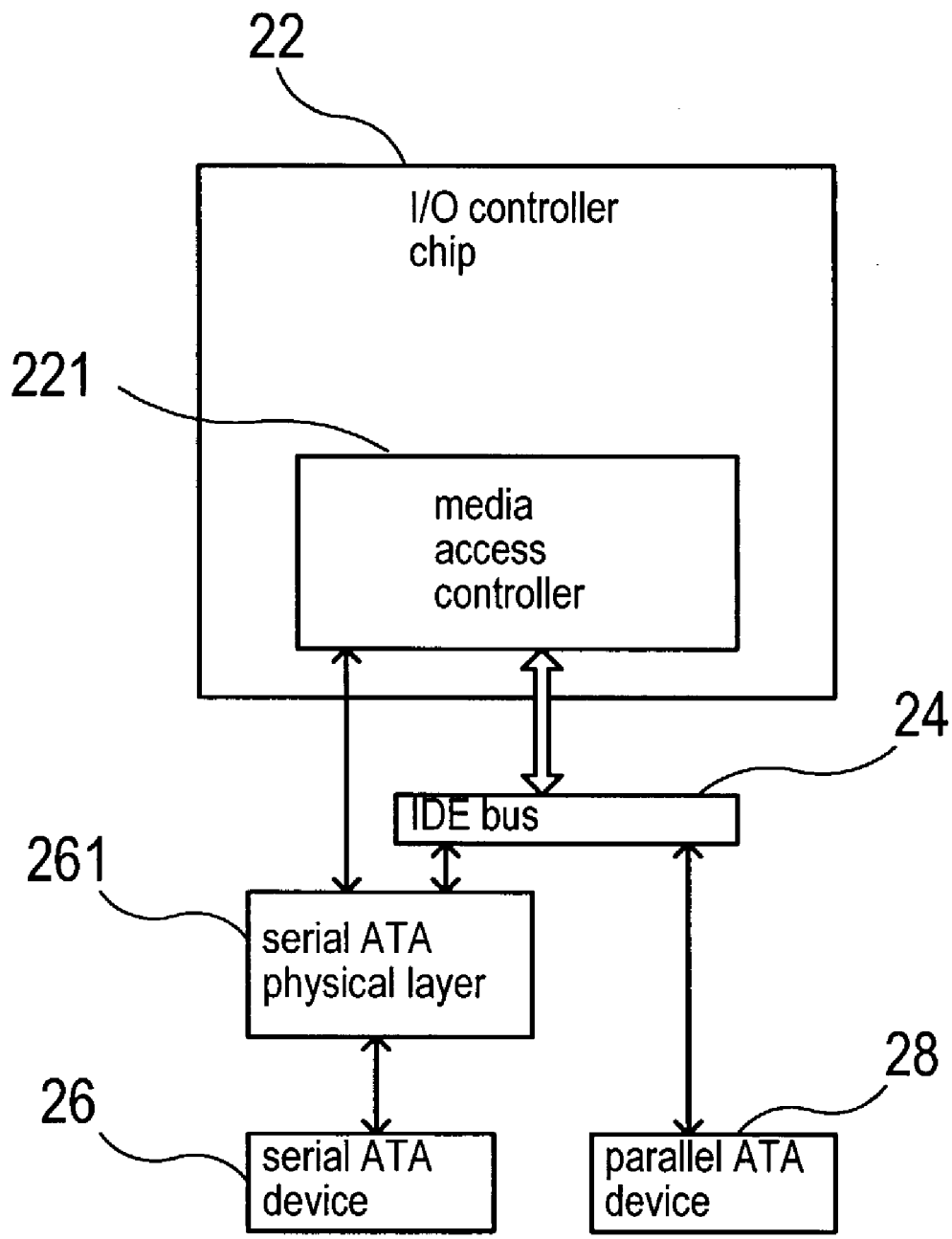
FIG. 2 is a block diagram of another prior art ATA physical layer apparatus.
Figure 3:
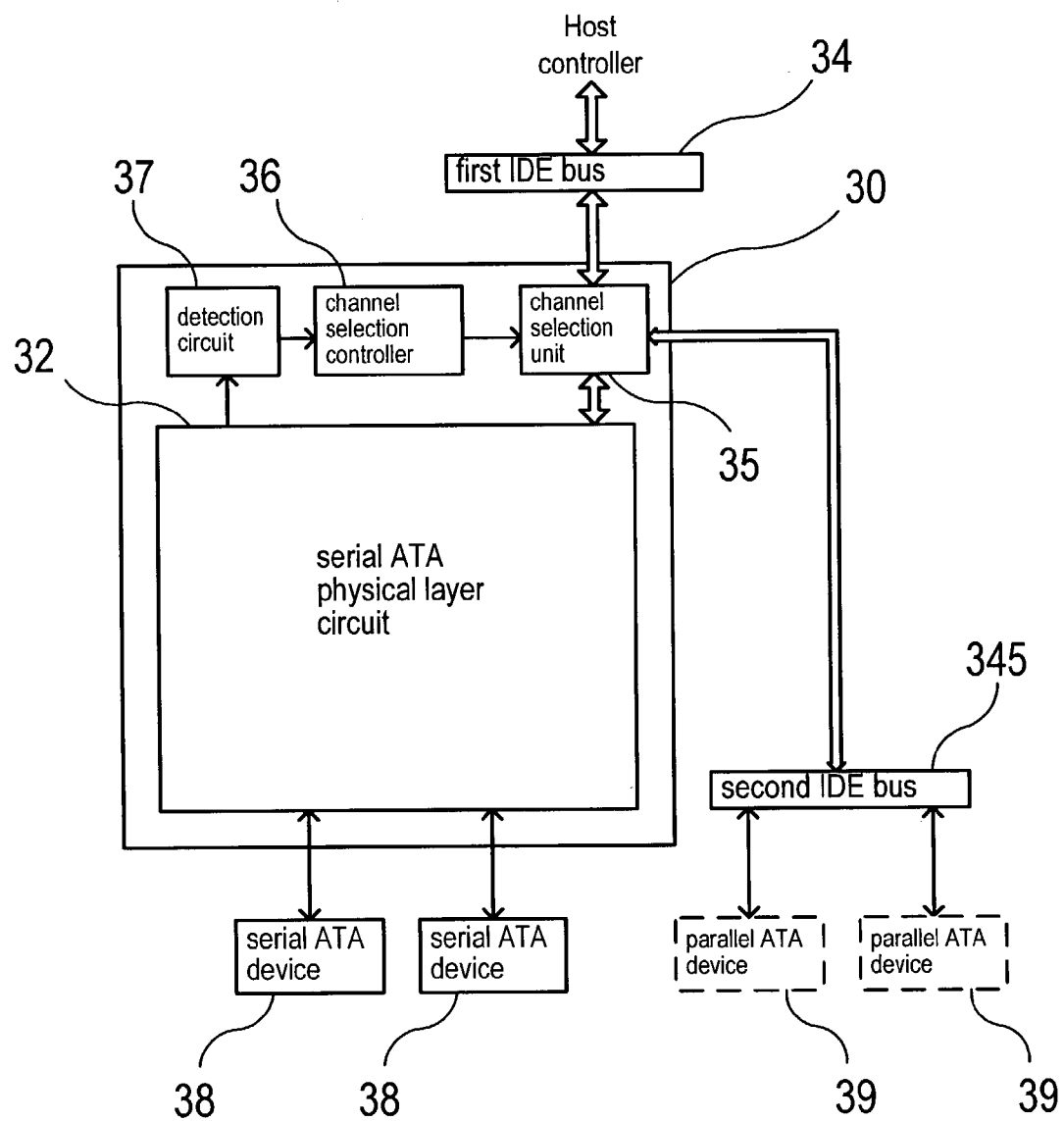
FIG. 3 is a block diagram of a preferred embodiment of the present invention.
Figure 4:
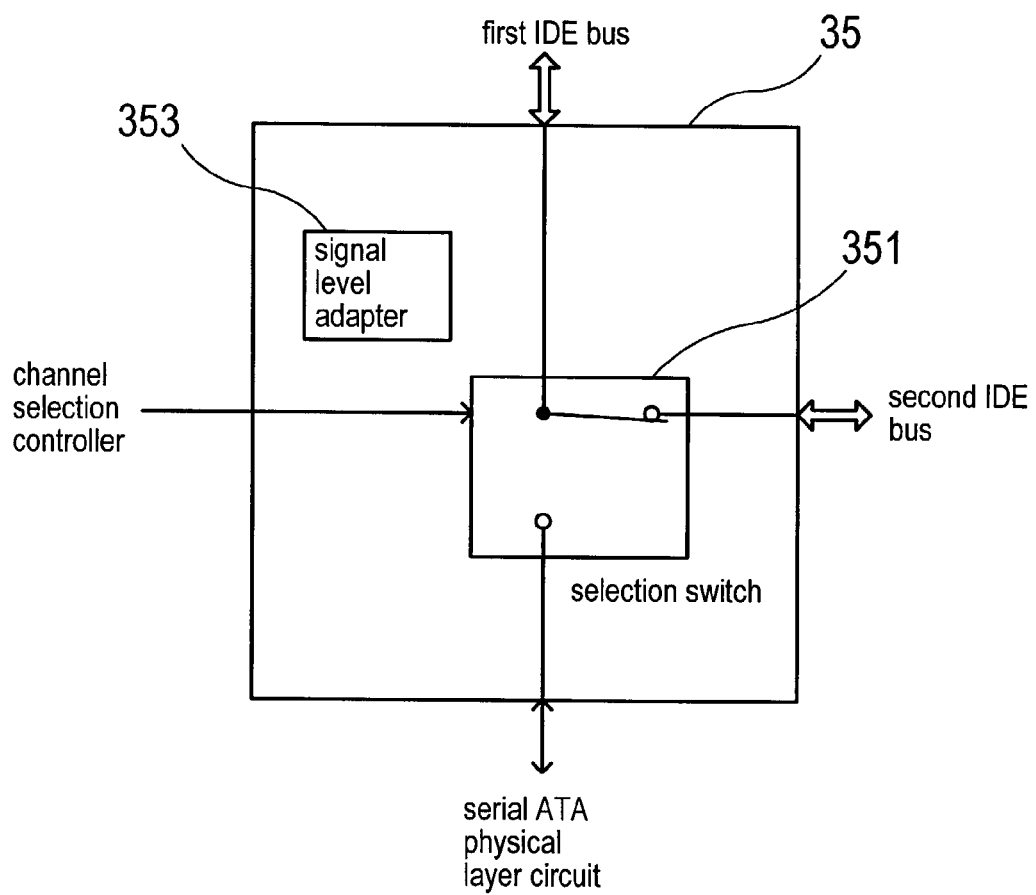
FIG. 4 details a channel selection unit in the preferred embodiment shown in FIG. 3.

FIG. 3 shows a block diagram of a preferred embodiment according to the present invention. FIG. 4 details a channel selection unit in the preferred embodiment. As shown in FIG. 3, the physical layer apparatus 30 for ATA interface comprises a serial ATA physical layer circuit 32, a channel selection unit 35 and a channel selection controller 36 for controlling the channel selection unit 35. The channel selection unit 35 has an accessing channel selectively connected to at least one serial ATA device 38 through the serial ATA physical layer circuit 32, and connected to a host controller (such as a media access controller, not labeled) through a first IDE bus 34. Therefore, the channel selection unit 35 provides a controllable bridge between the host controller and the serial ATA device 38. Moreover, the channel selection unit 35 is connected to the channel selection controller 36. The accessing channel of the channel selection unit 35 is selectively connected to at least one parallel ATA device 39 through a second IDE bus 345. By the control of the channel selection unit 35 and the channel selection controller 36, either the serial ATA device 38 or the parallel ATA device 39 can be selectively accessed by the host controller through the first IDE bus 34.

As shown in FIG. 4, the channel selection unit 35 comprises a selection switch 351 and a signal level adapter 353. The selection switch 351 is used to select an accessing channel to the second IDE bus 345 or to the serial ATA physical layer circuit 32. The serial ATA device has a higher transfer rate than that of the parallel ATA device. Therefore, the serial ATA device uses higher clock rate and lower voltage level. The signal level adapter 353 is used to adjust a voltage level at the first IDE bus 34. More particularly, the signal level adapter 353 adjusts a voltage level at the first IDE bus 34 to a lower level compatible with the voltage level of the serial ATA device when the host controller is to access the serial ATA physical layer circuit 32. The signal level adapter 353 adjusts a voltage level at the first IDE bus 34 to a higher level compatible with the voltage level of the parallel ATA device when the host controller is to access the second IDE bus 345.

The controlling of the channel selection controller 36 over the channel selection unit 35 can be implemented by software to determine the accessing channel for the channel selection unit 35. Alternatively, a detection circuit 37 is provided in the physical layer apparatus 30. The detection circuit 37 is driven by a signal from the serial ATA physical layer circuit 32 to determine whether a serial ATA device is to be accessed or not. In case that a serial ATA device is to be accessed, the channel selection controller 36 receives an output signal from the detection circuit 37 and controls the channel selection unit 35 to select its accessing channel to the serial ATA physical layer circuit 32. For example, if a serial ATA device is detected, the channel selection unit 35 selects an accessing channel to the serial ATA physical layer circuit 32 in response to a command of the channel selection controller 36. If a serial ATA device is not detected, the channel selection unit 35 selects an accessing channel to the second IDE bus 345 in response to a command of the channel selection controller 36.

Figure 5:
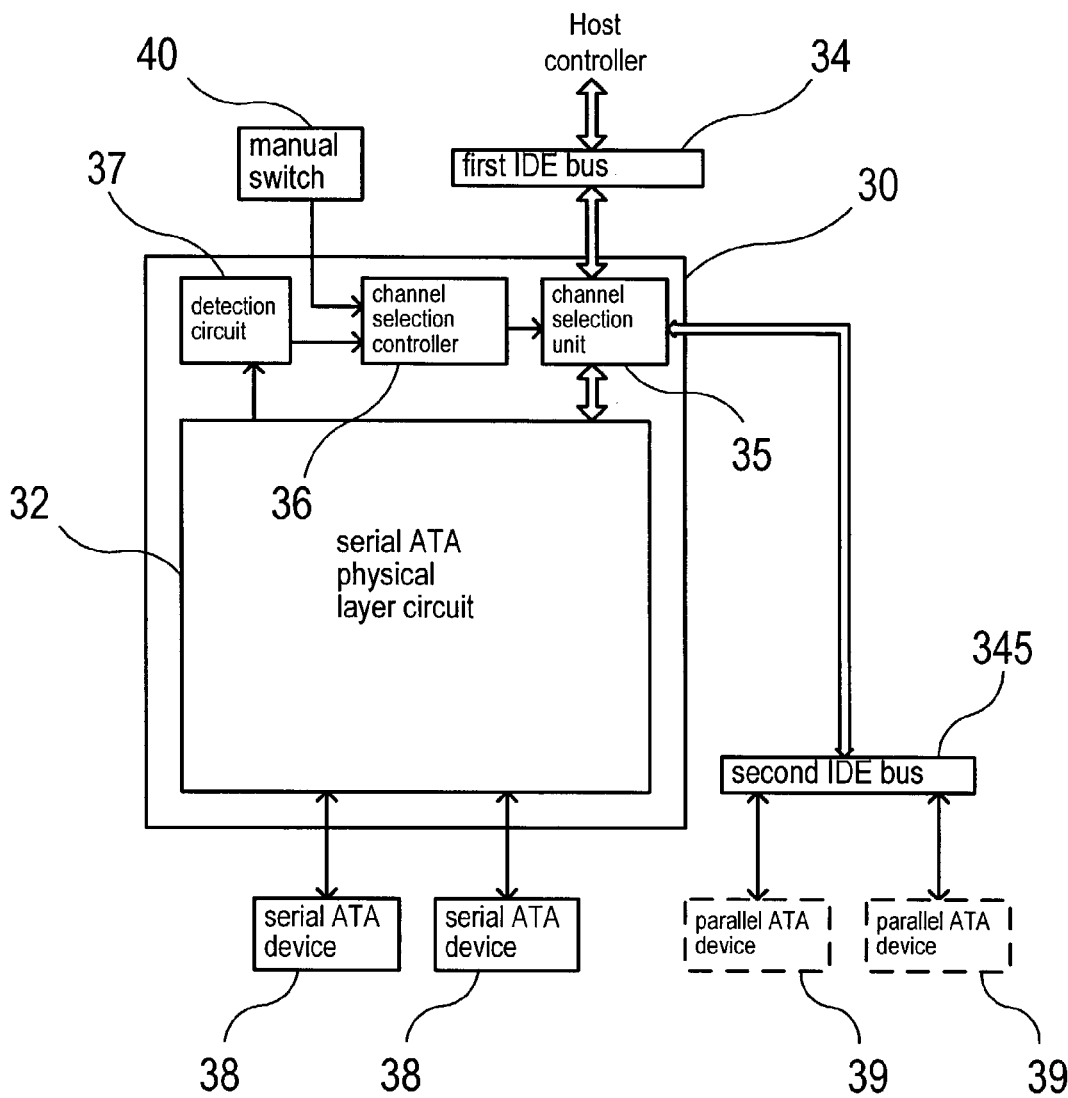
FIG. 5 is a block diagram of another preferred embodiment of the present invention.

FIG. 5 shows a schematic diagram of another preferred embodiment according to the present invention. This preferred embodiment is similar to previous one except that a manual switch 40 is provided in the physical layer apparatus 30 and connected to the channel selection controller 36 with the detection circuit 37. By the manual switch 40, the user can manually select an accessing channel for the second IDE bus 345 or the serial ATA physical layer circuit 32. Moreover, a user can also use the manual switch 40 to enable an automatic selection by the detection circuit 37.

In above mentioned preferred embodiments, the first IDE bus 34 and the second IDE bus 345 can be arranged at a front end (connected to the media access controller) and a rear end (connected to the parallel ATA device) of the same IDE bus. Moreover, all the components in the physical layer device 30 can be integrated to a single chip, which is directly mounted on a motherboard. Alternatively, the single chip can be mounted on a controller card.

Although the present invention has been described with reference to the preferred embodiment thereof, it will be understood that the invention is not limited to the details thereof. Various substitutions and modifications have suggested in the foregoing description, and other will occur to those of ordinary skill in the art. For example, the selection switch can be a multiplexer. Therefore, all such substitutions and modifications are intended to be embraced within the scope of the invention as defined in the appended claims.

We claim:

1. A physical layer apparatus for ATA interface, comprising:
   a serial ATA physical layer circuit, at least one serial ATA device being connected to said serial ATA physical layer circuit;
   a channel selection unit simultaneously connected to a media access controller of a host through a first IDE bus, said at least one serial ATA device through said serial ATA physical layer circuit, and at least one parallel ATA device through a second IDE bus, said channel selection unit selectively switching connection of said first IDE bus between said serial ATA physical layer circuit and said second IDE bus, wherein said serial ATA physical layer circuit is dedicated exclusively to said at least one serial ATA device, and wherein said second IDE bus is dedicated exclusively to said at least one parallel ATA device; and
   a channel selection controller connected to said channel selection unit to control said channel selection unit for selective switching between said serial ATA physical layer circuit and said second IDE bus for corresponding communication between the media access controller and either said at least one serial ATA device or said at least one parallel ATA device.

2. The physical layer apparatus for ATA interface as in claim 1, further comprising a detection circuit connected to said channel selection controller, wherein said detection circuit detects a connection state of said at least one serial ATA device with respect to said serial ATA physical layer circuit and drives said channel selection controller to generate a control signal indicative of said connection state of said at least one serial ATA device, said channel selection unit having an accessing channel controlled by said control signal to selectively switch the media access controller between said serial ATA physical layer circuit and said second IDE bus through said channel selection unit and said accessing channel.

3. The physical layer apparatus for ATA interface as in claim 2, wherein said accessing channel of said channel selection unit is controlled by a software.

4. The physical layer apparatus for ATA interface as in claim 2, further comprising a manual switch to set an automatic detection mode for channel selection, wherein said accessing channel is switched between said serial ATA physical layer circuit and said second IDE bus.

5. The physical layer apparatus for ATA interface as in claim 1, wherein said channel selection unit comprises a selection switch.

6. The physical layer apparatus for ATA interface as in claim 5, wherein said selection switch is a multiplexer.

7. The physical layer apparatus for ATA interface as in claim 1, further comprising a manual switch connected to said channel selection controller to change a setting of said channel selection controller.

8. The physical layer apparatus for ATA interface as in claim 1, wherein said physical layer apparatus is integrated into a discrete physical layer chip.

9. The physical layer apparatus for ATA interface as in claim 8, wherein said discrete physical layer chip is directly mounted on a motherboard.

10. The physical layer apparatus for ATA interface as in claim 8, wherein said discrete physical layer chip is integrated into a controller card.

* * * * *